US006970725B1

(12) United States Patent
Luetzenkirchen et al.

(10) Patent No.: US 6,970,725 B1
(45) Date of Patent: Nov. 29, 2005

(54) RADIO COMMUNICATION DEVICE COMPRISING A POWER EXTRACTION UNIT

(75) Inventors: Thomas Luetzenkirchen, Berlin (DE); Frank-Michael Luft, Schwanebeck (DE)

(73) Assignee: Siemens Aktiengesellschaft, Munich (DE)

( * ) Notice: Subject to any disclaimer, the term of this patent is extended or adjusted under 35 U.S.C. 154(b) by 583 days.

(21) Appl. No.: 10/031,994

(22) PCT Filed: Jul. 27, 2000

(86) PCT No.: PCT/DE00/02594

§ 371 (c)(1),
(2), (4) Date: Jan. 25, 2002

(87) PCT Pub. No.: WO01/08363

PCT Pub. Date: Feb. 1, 2001

(30) Foreign Application Priority Data

Jul. 27, 1999 (DE) ................................ 199 35 755

(51) Int. Cl.[7] .............................................. H04Q 7/32
(52) U.S. Cl. ................... 455/572; 455/571; 455/550.1; 455/556.1; 455/557; 379/433.01; 379/428.01; 320/114; 320/115
(58) Field of Search ............................. 455/572, 573, 455/574, 550.1, 556.1, 556.2, 557, 575.1, 455/403, 423, 424, 422.1, 571, 334, 343, 455/500, 517, 67.11, 425, 41.2, 41.3, 66.1, 455/73, 90.2, 90.3, 343.1, 343.6, 344; 320/114, 320/115; 379/433.1, 428.01

(56) References Cited

U.S. PATENT DOCUMENTS

| 4,009,341 | A |   | 2/1977  | Lemoussu             |
|-----------|---|---|---------|----------------------|
| 4,677,646 | A |   | 6/1987  | Dodds et al.         |
| 5,995,813 | A | * | 11/1999 | Ishikura et al. .......... 455/127.2 |
| 6,023,610 | A | * | 2/2000  | Wood, Jr. ................... 455/101 |
| 6,212,403 | B1| * | 4/2001  | Ushiroda ..................... 455/557 |

FOREIGN PATENT DOCUMENTS

| DE | 44 13 211 A1 | 10/1995 |
| DE | 195 20 947 A1 | 12/1996 |
| DE | 197 55 946 A1 | 7/1998 |
| EP | 0 827 123 A1 | 3/1998 |
| WO | WO 95/34958 | 12/1995 |
| WO | 196 29 291 A1 | 1/1997 |

OTHER PUBLICATIONS

Schnurlos in die Online-Welt, "Schnurlose Freiheit fuer grenzenlose Kommunikation", Deutsche Telekom (Aug. 1998).

* cited by examiner

*Primary Examiner*—Keith Ferguson
(74) *Attorney, Agent, or Firm*—Morrison & Foerster LLP

(57) ABSTRACT

The invention relates to a radio device and method for transmitting radio signals including an electrical interface having at least one data terminal for connecting the radio device to an external data source, and comprising a transmitting device which is in communication with the at least one data terminal and which generates the radio signals with data signals of the external data source, transmitted via the at least one data terminal. The radio device exhibits an energy extraction device, the input of which is connected to the at least one data terminal and the output of which is connected to a power supply input of the transmitting device and which takes energy from the data signals of the external data source and feeds this energy at the power supply input into the transmitting device in order to operate it.

6 Claims, 2 Drawing Sheets

RADIO COMMUNICATION DEVICE COMPRISING A POWER EXTRACTION UNIT

CLAIM FOR PRIORITY

This application claims priority to International Application No. PCT/DE00/02594 which was published in the German language on Jul. 27, 2000.

TECHNICAL FIELD OF THE INVENTION

The invention relates to a radio device and method for transmitting radio signals, and in particular, to a radio comprising an electrical device and method using at least one data terminal and a transmitting device.

BACKGROUND OF THE INVENTION

A radio device sold by Deutsche Telekom as a PCMCIA card under the product name "Teledat cordless PCMCIA" is now described. This card has a PCMCIA interface by means of which the card can be connected to a laptop or notebook as external data source. A transmitting device which generates radio signals in the DECT standard with data signals of the external data source transmitted via the interface and sends these to a remotely arranged DECT base transceiver station is connected to at least one data terminal of the interface. The interface of the previously known radio device has, in addition to the at least one data terminal, a power supply terminal via which the radio device is supplied with power from the laptop or notebook.

SUMMARY OF THE INVENTION

In one embodiment of the invention, there is a radio device for transmitting radio signals which includes an electrical interface having at least one data terminal to connect the radio device to an external data source, a transmitting device which is in communication with the at least one data terminal and which generates the radio signals with data signals of the external data source, transmitted via the at least one data terminal and an energy extraction device, the input of which is connected to the at least one data terminal and the output of which is connected to a power supply input of the transmitting device and which takes energy from the data signals of the external data source and feeds the energy at the power supply input into the transmitting device in order to operate it, wherein the transmitting device includes another power supply unit to connect an external power supply device, and the radio signals generated by the transmitting device exhibit a first predetermined transmitting power in where the power is supplied by the energy extraction device and exhibit a second predetermined transmitting power exceeding the predetermined transmitting power in where voltage/current is applied to the another power supply input.

In one aspect of the invention, the input of the energy extraction device has a rectifying device which is followed by an energy store connected to the power supply input of the transmitting device.

In another aspect of the invention, the rectifying device includes a diode for rectification.

In still another aspect of the invention, the interface is a parallel interface having a number of data terminals.

In yet another aspect of the invention the interface is an IEEE 1284 interface.

In another embodiment of the invention, a radio method for transmitting radio signals includes an electrical interface having at least one data terminal to connect the radio method to an external data source, a transmitting method which is in communication with the at least one data terminal and which generates the radio signals with data signals of the external data source, transmitted via the at least one data terminal and an energy extraction method, the input of which is connected to the at least one data terminal and the output of which is connected to a power supply input of the transmitting method and which takes energy from the data signals of the external data source and feeds the energy at the power supply input into the transmitting method in order to operate it, wherein the transmitting method includes another power supply unit to connect an external power supply method, and the radio signals generated by the transmitting method exhibit a first predetermined transmitting power in where the power is supplied by the energy extraction method and exhibit a second predetermined transmitting power exceeding the predetermined transmitting power in where voltage/current is applied to the another power supply input.

DETAILED DESCRIPTION OF THE PREFERRED EMBODIMENTS

Figure 1:
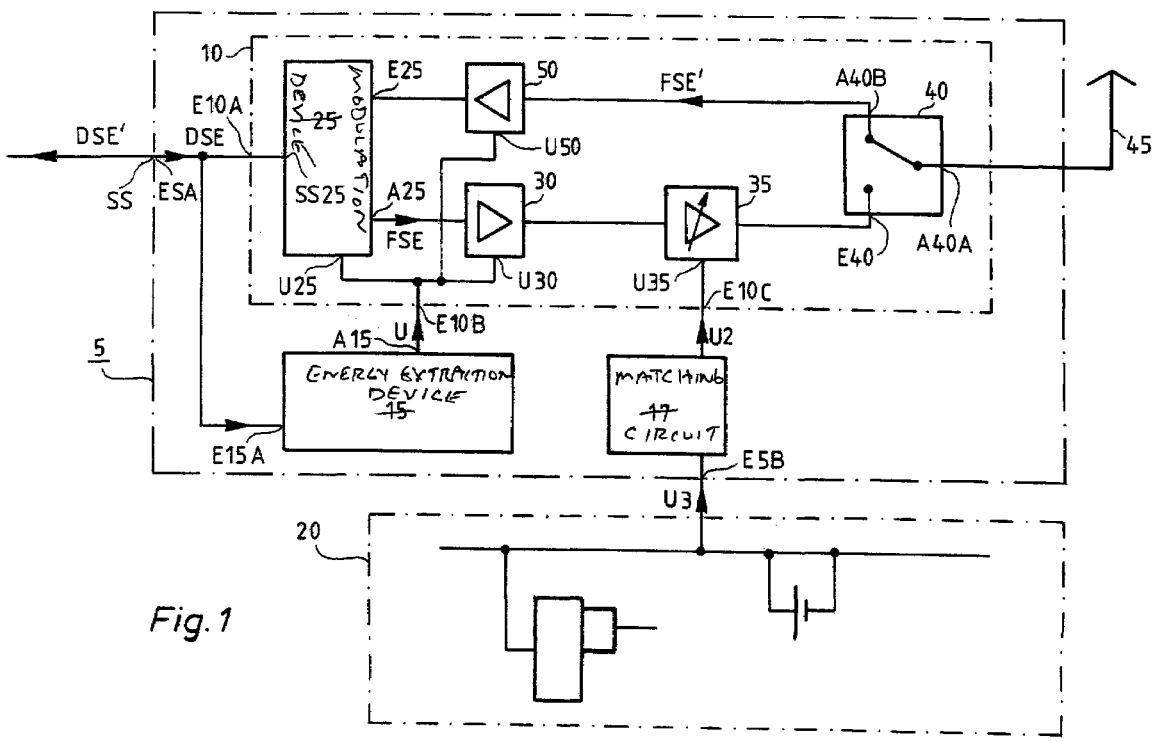
FIG. 1 shows an exemplary embodiment of a radio device with an energy extraction device according to the invention.

The invention relates to a radio device for transmitting radio signals comprising an electrical interface having at least one data terminal for connecting the radio device to an external data source and comprising a transmitting device which is in communication with the at least one data terminal and which generates the radio signals with data signals of the external data source, transmitted via the at least one data terminal.

One embodiment of the invention discloses a radio device which manages without a power supply terminal and which can be operated without a separate external power supply.

According to the invention, a radio device has an energy extraction device, the input of which is connected to the at least one data terminal and the output of which is connected to a power supply input of the transmitting device and which takes energy from the data signals of the external data source and feeds this energy at the power supply input into the transmitting device in order to operate it.

An advantage of the radio device according to the invention is that it can be operated even without separate power supply since it has an energy extraction device which takes energy from the data signals of the external data source and feeds this energy into the transmitting device in order to operate it. Data signals generally include more energy than is actually required for the transmitting device so that this excess energy can be utilized for operating the radio device. Another advantage of the radio device according to the invention is that, it does not need to exhibit a separate power supply terminal for an external power supply device.

Another embodiment of the radio device according to the invention includes the energy extraction device having as an input a rectifying device which is followed by an energy store connected to the power supply input of the transmitting device. This embodiment of the radio device ensures that energy stored in the energy extraction device flows in the direction of the transmitting device and not in the direction of the interface from the energy extraction device.

The rectifying device of the energy extraction device can be implemented in a simple and inexpensive manner if it includes a diode for the rectification.

Since in a parallel interface (as opposed to a serial interface) generally more data terminals and thus more data signals are available, the energy of which can be utilized by the energy extraction device it is considered to be advantageous if the interface is a parallel interface having a number of data terminals. It is known that data can be transmitted more rapidly via a parallel interface than via a serial interface.

The IEEE 1284 interface has been particularly successful as an interface for use in the computer domain with the result that it is considered to be advantageous is the interface is an IEEE 1284 interface.

The radio device according to the invention can also exhibit transmitting powers which require more energy than can be obtained by means of the energy extraction device.

In another embodiment of the radio device according to the invention, the transmitting device has a further power supply input for connecting an external power supply device. The transmitting device is of such a nature that the radio signals generated by it exhibit a first predetermined transmitting power where the power is supplied by the energy extraction device, and exhibit a second predetermined transmitting power exceeding the predetermined transmitting power where voltage/current is applied to the further power supply input.

FIG. 1 shows a radio device 5 for transmitting radio signals FSE, with an electrical interface SS in the form of an IEEE 1284 interface. For the sake of clarity, FIG. 1 shows a single data terminal of the interface SS. In the figure, the data terminal carries the reference symbol E5A. The data terminal E5A or, respectively, the interface SS, is connected to a data input E10A of a transmitting device 10 and an input E15A of an energy extraction device 15. The energy extraction device 15 has an output A15 which is connected to a power supply input E10B of the transmitting device 10. A further power supply input E10C of the transmitting device 10 is connected via a matching circuit 17 to a power supply terminal E5B of the radio device 5. At the power supply terminal E5B, the radio device 5 is preceded by a power supply device 20 in the form of a mains adapter or a battery.

The transmitting device 10 exhibits at its input a modulation device 25, the interface input SS25 of which is connected to the data input E10A of the transmitting device 10. An output A25 of the modulation device 25 is connected to an output amplifier 30 which is followed by a power amplifier 35. At the output end, this power amplifier 35 is connected to an input E40 of a signal diplexer 40 which is followed at an output A40A by an antenna 45 for transmitting and receiving radio signals. A further output A40B of the signal diplexer 40 is followed by an input amplifier 50 which is followed by an input E25 of the modulation device 25.

For the purpose of energy supply, the modulation device 25, the input amplifier 50 and the output amplifier 30 in each case have a power supply input—reference symbol U25, U30 and U50, which is connected to the one power supply input E10B of the transmitting device 10 and to the output A15 of the energy extraction device 15. The modulation device 25 can be, for example, a digital modulation/demodulation device which operates in the DECT, GSM, Bluetooth or another comparable standard. Consequently, the transmitting device 20 can be a DECT, GSM, Bluetooth or comparable device.

The radio device 5 according to the invention is operated as follows. A data signal DSE of an external data source (not shown), for example a computer, which is fed into the transmitting device 10 via the interface SS is fed into the transmitting device 10 and thus into the modulation device 25. In the modulation device 25, the data signal DSE is converted into a radio signal FSE and transmitted to the amplifier 30. In the amplifier 30, the radio signal FSE is amplified and transmitted via the signal diplexer 40 to the antenna 45 in which the radio signal FSE is radiated. If necessary, the power of the radio signal FSE is amplified in the power amplifier 35 before it is radiated. Whether power amplification is carried out in the power amplifier 35 depends on whether an operating voltage U2 is applied to the power amplifier 35 via the matching circuit 17 from the power supply device 20. If this is not the case, the power amplifier 35 acts "transparently" and allows the radio signal FSE to pass unattenuated. The matching circuit 17 is thus used for transforming or converting an output voltage U3 of the power supply device 20 into the operating voltage U2 suitable for the power amplifier 35.

The transmitting device 10 can also be operated as a receiving device so that it could also be called a transceiver device or transmitting and/or receiving device. If a received radio signal FSE' is received via the antenna 45, it passes via the signal diplexer 40 to the further amplifier 50, where it is amplified. The received radio signal FSE' then passes to input E25 of the modulation device 25, where it is demodulated by a suitable demodulation method and converted into a received data signal DSE'. This received data signal DSE' is output via the interface SS.

The modulation device 25 and the two amplifiers 30 and 50 are supplied with energy or, respectively, supply voltage or current by the energy extraction device 15. This is done in such a manner that the data signals DSE transmitted via the interface SS are transmitted to the energy extraction device 15 where energy is taken from the data signals DSE, which is output in the form of a supply voltage U to the one power supply input E10B of the transmitting device 10, and thus to the modulation device 25 and the two amplifiers 30 and 50. The manner in which the energy extraction device 25 extracts the energy from the data signals DSE will be explained in connection with FIG. 2.

As already discussed, the transmitting device 10 is connected to the matching circuit 17 which is connected to the power supply device 20 and which feeds the operating voltage U2 into the power amplifier 35. As already explained, this power amplifier 35 is used for amplifying the radio signal FSE which is already preamplified in the one amplifier 30. If a low transmitting power as delivered by the output amplifier 30 is sufficient for operating the radio device 5, the use or operation of the power amplifier 35 can be omitted. In this case, the power amplifier can be switched off or switched to "passage" by disconnecting the power supply device 20 from the power amplifier 35. The transmitting device 10 then operates without external power supply and, in consequence, without power amplification. If, in contrast, it is intended to transmit with greater output power than is possible by means of the energy of the energy extraction device 25 alone, this greater output power can be achieved by connecting the power supply device 20 to the power amplifier 35.

Figure 2:
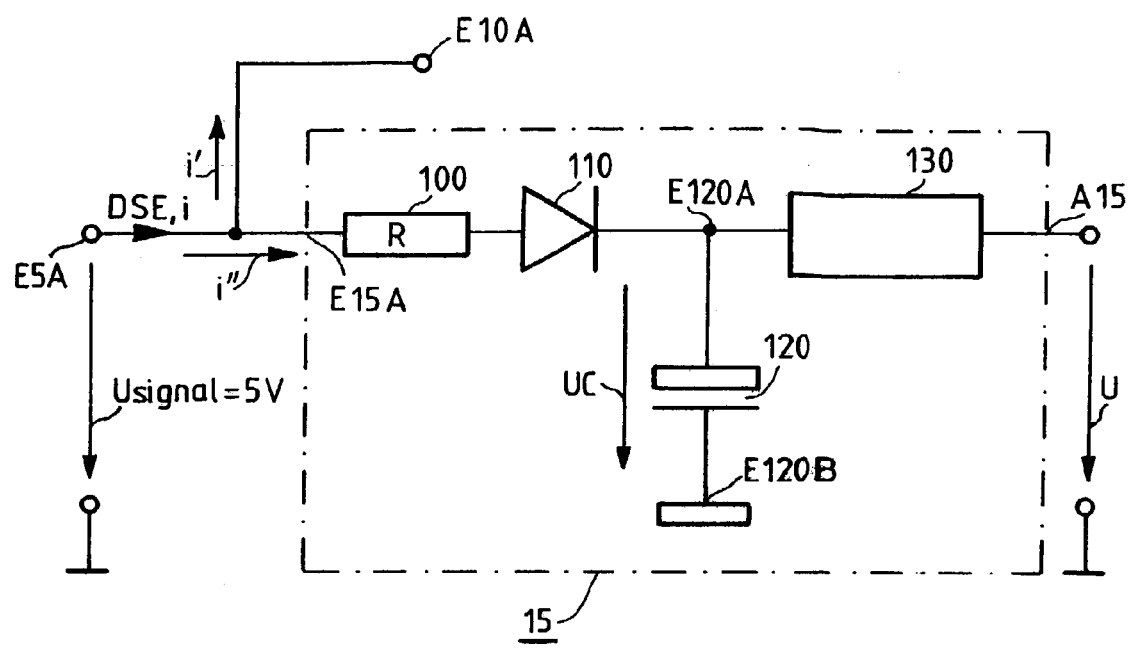
FIG. 2 shows an exemplary embodiment of the energy extraction device.

It will now be explained in conjunction with FIG. 2 and using an example how the energy extraction device 15 can be configured. At input E15A of the energy extraction device 15, a current limiting device in the form of a resistor 100 is provided which is followed by a diode 110 as rectifying device. The diode 110 is followed by a capacitor 120 as energy store, across the two terminals E120A and E120B of which a capacitor voltage Uc is present. One of the two terminals E120A is connected to a DC/DC converter 130 which converts the capacitor voltage UC into the supply voltage U for the one power supply input E10B of the transmitting device 10. The DC/DC converter 130 can be a conventional, commercially available converter. The converter is selected in such a manner that it transforms the capacitor voltage Uc, which depends on the signal voltage Usignal of the data signal DSE or, respectively, on the voltage level of the interface SS, to the magnitude suitable for the one power supply input E10B of the transmitting device 10. It may also be possible to omit the DC/DC converter 130 if the signal voltage Usignal of the data signal DSE matches the supply voltage U required for the transmitting device 10. This is the case, for example, if the data signal DSE, and thus the interface SS, have the same voltage level as is needed as supply voltage U by the transmitting device 10.

In the text which follows, an example of dimensioning of the resistor 100 will be specified. The assumption is that the signal voltage Usignal of the data signal DSE is Usignal= 5 V. According to the representation in FIG. 2, the total current i, carrying the data signal DSE, flowing into the radio device 5 at the interface SS or, respectively, at input E5, is divided into two part currents i' and i". One part current i' flows into the transmitting device 10 at input E10A and transmits the data signal DSE to the transmitting device 10. The other part current i" is utilized in the energy extraction device 15. So that the interface SS is not overloaded, it should be ensured that the total current i=i'+i" is not greater than the maximum permissible current imax which is allowed to flow at a maximum via the interface SS or, respectively, via the data terminal E5A. For this purpose, the resistor R is provided which operates as current limiter and correspondingly limits the current. If, for example, a maximum permissible current imax of 20 mA and a part current i' of 5 mA flowing into the transmitting device 10 is assumed and if the signal voltage Usignal is, for example, Usignal=5 V, the following is obtained for the resistor R:

$$i''=i-i'=20 \text{ mA}-5 \text{ mA}=15 \text{ mA}$$

$$R=Usignal/i''=Usignal/(i-i')=5 \text{ V}/15 \text{ mA}=333 \text{ }\Omega$$

In this example, the threshold voltage of the diode is neglected. The capacitor voltage Uc across the capacitor 120 is assumed to be 0 V since the capacitor 120 is generally discharged when the radio device 5 is switched on.

Once the other part current i" has passed through the resistor 100, it passes via diode 110 to the downstream capacitor 120 and the DC/DC converter 130. Diode 120 prevents the energy stored in the capacitor 120 from being able to flow off or back, respectively, from the capacitor 120 via the data terminal E5A or, respectively, the interface SS from the radio device 5 in the case of changes in potential—for example to zero volts—at the interface SS or, respectively, the data terminal E5A.

The downstream DC/DC converter 130 generates from the capacitor voltage Uc the supply voltage U for the transmitting device 10. The DC/DC converter 130 does not necessarily need to be integrated in the energy extraction device 15. For example, it can also be provided at the power supply input end in the transmitting device 10. This would usually be the case in radio devices such as mobile telephones since their transmitting devices generally have corresponding DC/DC converters in any case for processing battery voltage.

What is claimed is:

1. A radio device for transmitting radio signals, comprising:
    an electrical interface having at least one data terminal configured to connect the radio device to an external data source;
    a transmitting device in communication with the at least one data terminal and which generates the radio signals with data signals of the external data source, transmitted via the at least one data terminal; and
    an energy extraction device, the input of which is connected to the at least one data terminal and the output of which is connected to a power supply input of the transmitting device, and which takes energy from the data signals of the external data source and feeds the energy at the power supply input into the transmitting device, wherein the transmitting device includes another power supply input to connect an external power supply device, and the radio signals generated by the transmitting device exhibit a first predetermined transmitting power where the power is supplied by the energy extraction device and exhibit a second predetermined transmitting power exceeding the predetermined transmitting power where voltage/current is applied to the another power supply input.

2. The radio device as claimed in claim 1, wherein the input of the energy extraction device has a rectifying device which is followed by an energy store connected to the power supply input of the transmitting device.

3. The radio device as claimed in claim 2, wherein the rectifying device includes a diode for rectification.

4. The radio device as claimed in claim 1, wherein the interface is a parallel interface having a number of data terminals.

5. The radio device as claimed in claim 4, wherein the interface is an IEEE 1284 interface.

6. A radio method for transmitting radio signals, comprising:
    connecting a radio device, via at least one data terminal, to an external data source;
    communicating, via a transmission device, with the at least one data terminal and generating the radio signals with data signals of the external data source, transmitted via the at least one data terminal; and
    connecting an input of an energy extraction device to the at least one data terminal and an output connected to a power supply input of the transmitting device and which takes energy from the data signals of the external data source and feeds the energy at the power supply input into the transmitting device, wherein the transmitting device includes another power supply unit to connect an external power supply device, and the radio signals generated by the transmitting device exhibit a first predetermined transmitting power where the power is supplied by the energy extraction device and exhibit a second predetermined transmitting power exceeding the predetermined transmitting power where voltage/current is applied to the another power supply input.

* * * * *